(12) United States Patent
Tucker et al.

(10) Patent No.: US 12,229,934 B1
(45) Date of Patent: Feb. 18, 2025

(54) METHOD AND SYSTEM FOR TRAINING AN ARTIFICIAL NEURAL NETWORK UTILIZING PHYSICS BASED KNOWLEDGE

(71) Applicant: National Technology & Engineering Solutions of Sandia, LLC, Albuquerque, NM (US)

(72) Inventors: James Derek Tucker, Edgewood, NM (US); Matthew Thomas Martinez, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 473 days.

(21) Appl. No.: 17/579,324

(22) Filed: Jan. 19, 2022

(51) Int. Cl.
  *G06K 9/00* (2022.01)
  *G06T 7/00* (2017.01)
  *G06V 10/82* (2022.01)

(52) U.S. Cl.
  CPC ............ *G06T 7/0004* (2013.01); *G06V 10/82* (2022.01); *G06T 2200/24* (2013.01); *G06T 2207/10081* (2013.01); *G06T 2207/10116* (2013.01); *G06T 2207/20081* (2013.01); *G06T 2207/20084* (2013.01)

(58) Field of Classification Search
  CPC ............... G06T 7/0004; G06T 2200/24; G06T 2207/10081; G06T 2207/10116; G06T 2207/20081; G06T 2207/20084; G06V 10/82
  See application file for complete search history.

(56) References Cited

U.S. PATENT DOCUMENTS

| | | | |
|---|---|---|---|
| 9,495,139 B2 | 11/2016 | Stitt et al. | |
| 10,049,295 B2 | 8/2018 | G-Michael et al. | |
| 11,010,513 B2 | 5/2021 | Weiss | |
| 11,074,511 B2 | 7/2021 | Patil et al. | |

OTHER PUBLICATIONS

Girshick, R., "Fast R-CNN," arXiv preprint arXiv:1504.08083, 2015, 9 pages.
Long, J. et al.I, "Fully convolutional networks for semantic segmentation," Proc. IEEE Comput. Soc. Conf. Comput. Vis. Pattern Recognit., 2015, pp. 3431-3440.
Chen, W. et al., "Beyond triplet loss: a deep quadruplet network for person re-identification," arXiv preprint arXiv:1704.01719, 2017, 10 pages.

(Continued)

*Primary Examiner* — Xin Jia
(74) *Attorney, Agent, or Firm* — Daniel J. Jenkins; Merle W. Richman

(57) ABSTRACT

A method for training an artificial neural network including classifiers for material characterization. The method includes obtaining functional data having phase and amplitude, registering functional data by phase-amplitude separation and statistical analysis on the phase-amplitude separated data with an elastic distance to produce aligned functional data, performing dimensional reduction on the aligned functional data to produce a dimensional representation of the functional space, performing, by a computer system, a training operation to train an artificial neural network based on the dimensional representation of the functional space. A method and system for material characterization is also disclosed.

20 Claims, 7 Drawing Sheets

(56) References Cited

OTHER PUBLICATIONS

Carbune, V. et al., "Fast multi-language LSTM-based online handwriting recognition," arXiv preprint arXiv:1902.10525, 2019, 14 pages.
Goodfellow, I. et al., Deep learning. MIT press, 2016, 802 pages.
Stigler, S. M., "Do robust estimators work with real data?" The Annals of Statistics (1977) 5(6):1055-1098.
Karpatne, A. et al., "Theory-guided data science: A new paradigm for scientific discovery from data," IEEE Transactions on Knowledge and Data Engineering (2017) 29(10):2318-2331.
Lee, S. et al., "Basic research needs for scientific machine learning: Core technologies for artificial intelligence," USDOE Office of Science (SC)(United States), Tech. Rep., 2019, 109 pages.
Rudin, C., "Stop explaining black box machine learning models for high stakes decisions and use interpretable models instead," arXiv preprint arXiv:1811.10154, 2019, 20 pages.
Koundinyan, S. P. et al., "Machine learning for industrial material classification applications with color ct datasets," Sandia National Laboratories, Tech. Rep., 2018, SAND2018-3139C, 15 pages.
Gallegos, I. O. et al., "Unsupervised learning methods to perform material identification tasks on spectral computed tomography data," Proceedings vol. 10763, Radiation Detectors in Medicine, Industry, and National Security XIX, vol. 10763, 2018, 15 pages.
Jimenez, E. et al., "Leveraging multi-channel x-ray detector technology to improve quality metrics for industrial and security applications," Proceedings vol. 10393, Radiation Detectors in Medicine, Industry, and National Security XVIII, vol. 10393, 2017, 12 pages.
Srivastava, A. et al., "Shape analysis of elastic curves in euclidean spaces," IEEE Transactions on Pattern Analysis and Machine Intelligence (2011) 33(7):1415-1428.
Kurtek, S., "Signal estimation under random time-warpings and nonlinear signal alignment," Proceedings of Neural Information Processing Systems (NIPS), 2011, 9 pages.
Tucker, J. D. et al., "Generative models for functional data using phase and amplitude separation," Computational Statistics and Data Analysis (2013) 61:50-66.
Srivastava, A. et al., Functional and shape data analysis. Springer, 2016, 454 pages.
Robinson, D. T., "Functional data analysis and partial shape matching in the square root velocity framework," Ph.D. dissertation, Florida State University, 2012, 73 pages.
Marron, J. S. et al., "Functional data analysis of amplitude and phase variation," Statistical Science (2015) 30(4):468-484.
Lahiri, S. et al., "Precise matching of PL curves in Rn in the Square Root Velocity framework," Geometry, Imaging and Computing (2015) 2:133-186.
Van Der Maaten, L et al., "Visualizing Data Using t-SNE," Journal of Machine Learning Research (2008) 9:2579-2605.
McInnes, L. et al., "UMAP: Uniform Manifold Approximation and Projection for Dimension Reduction," arXiv:1802.03426v2 [stat. ML], 2020, 63 pages.
Niita, K. et al., "PHITS—a particle and heavy ion transport code system," Radiation Measurements (2006) 41(9):1080-1090.
Jimenez, E. et al., "Developing Imaging Capabilities of Multi-Channel Detectors Comparable to Traditional X-Ray Detector Technology for Industrial and Security Applications," SPIE Optical Engineering+ Applications. International Society for Optics and Photonics, 2016, 11 pages.
Jimenez, E. et al., "Leveraging multi-channel x-ray detector technology to improve quality metrics for industrial and security applications," SPIE Optical Engineering+ Applications. International Society for Optics and Photonics, 2017, 12 pages.
Gallegos, I. et al., "High-fidelity calibration and characterization of a spectral computed tomography system," SPIE Optical Engineering+ Applications. International Society for Optics and Photonics, 2019, 15 pages.
Simonyan, K. et al., "Very deep convolutional networks for large-scale image recognition," 2015, arXiv:1409.1556, 14 pages.
Nair, V. et al., "Rectified linear units improve restricted boltzmann machines," Proc. 27th Int. Conf. on Int. Conf. Mach. Learning, Jun. 2010, pp. 807-814.
Ioffe, S. et al., "Batch normalization: Accelerating deep network training by reducing internal covariate shift," 2015, arXiv:1502.03167, 11 pages.
Paszke, A. et al., "Automatic differentiation in PyTorch," 31st Conf. Neural Inform. Process. Syst., 2017, 4 pages.
Kingma, D. P. et al., "Adam: A method for stochastic optimization," 2014, arXiv:1412.6980, 15 pages.
Bishop, C. M., Pattern Recognition and Machine Learning (Information Science and Statistics). Secaucus, NJ, USA: Springer-Verlag New York, Inc., 2006, 758 pages.
Kuhn, M. et al., Applied Predictive Modeling. New York, Heidelberg, Dordrecht, London: Springer, 2013, 615 pages.
Pedregosa, F. et al., "Scikit-learn: Machine learning in Python," Journal of Machine Learning Research (2011) 12:2825-2830.

METHOD AND SYSTEM FOR TRAINING AN ARTIFICIAL NEURAL NETWORK UTILIZING PHYSICS BASED KNOWLEDGE

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to a method and system for training an artificial neural network for material characterization and methods and systems for material characterization.

BACKGROUND OF THE INVENTION

Computed tomography (CT) is an important tool in the non-destructive analysis of objects and materials. While traditional CT methods using Bremsstrahlung radiation sources suffer from noise and artifacts due to lack of penetration or nonlinearities in material absorption (i.e., beam hardening), high-energy spectral CT can enhance performance by generating higher-quality images. Multichannel color CT systems utilized for material characterization produce energy-resolved data that correlate with materials' attenuation profiles. Spectral CT data also provide increased information for analysis than traditional CT data, indicating that multichannel CT data approaches possess higher potential to identify and analyze materials. Processing of this data has included distance-based unsupervised clustering algorithms include centroid-based, density based, and connectivity-based algorithms. These algorithms find relationships between data points by analyzing the similarity or dissimilarity between pairs or collections of objects in a dataset; the similarity measure is defined as a set distance metric, such as Euclidean distance, cosine distance, or Manhattan distance. The use of such data analysis techniques provide certain limitations, particularly with the analysis of particular materials.

Over the last few years, purely data-driven machine learning methods using deep neural networks (DNNs) have achieved state-of-the-art results in object detection, image segmentation, facial recognition, and handwriting recognition. The recent success in these application domains has relied on the availability of vast amounts data which allow DNNs to learn data representations from complex input-output relationships. Because of the reliance on large amounts of training data, purely data-driven models do not adhere to physics based theory about the process being modeled. In contrast, statistical models have incorporated scientific theory on relatively small datasets to conduct inference and prediction. For example, some of the first fundamental problems involved estimating the speed-of-light and the parallax of the sun. However, formulating these statistical methods can be difficult when the data are high-dimensional or when the scientific theory is encoded within the coupling of many partial differential equations. This often results in simplifications that hinder model performance and validity.

Both theory based and data-driven approaches have been proposed for modeling physical phenomena. Theory based methods apply scientific knowledge and first principles to solve closed form equations and/or develop computational models/simulations. Data-driven methods use observations of a physical phenomenon and machine learning (ML) models to learn patterns from a set training observation. Although both methods have their strengths, they also have their limitations. Purely theory-based methods for modeling complex processes tend to make simplifications that reduce model performance and increase the difficulty in analysis of the model, whereas purely data-driven methods are limited in the amount of available observations which cause them to fail to generalize well to unseen observations. Additionally, machine learning methods can be difficult to interpret and fail to explain the underlying physical process.

A purely data-driven approach to material classification/identification would be to train a classifier in a fully supervised manner using a set of labeled hyperspectral computed tomography (H-CT) voxels, where each voxel is provided a label that represents a different material. In the case of a deep neural network, the training phase minimizes the cross-entropy loss, or the difference between the desired and predicted probability distribution of class labels. However, the use of cross-entropy loss requires that the training set is similar to the expected responses in an unlabeled set of test voxels. One of the challenges with H-CT data is that there are relatively few training examples for different materials collected under various conditions (e.g., shielding, orientation, etc.) making it difficult to construct a representative training set. Previous approaches in material classification in H-CT scans has focused supervised and unsupervised approached. It has been demonstrated the ability for logistic regression, support vector machines, and neural networks to identify materials such as water, Teflon, salt, diet soda, etc. In addition, centroid-, density-, and connectivity-based clustering algorithms have been used to differentiate isolated materials in H-CT scans. Although these methods have demonstrated the applicability of machine learning for material identification in H-CT scans, they are completely data-driven methods.

Purely data-driven machine learning methods have achieved state-of-the-art results for object detection, image segmentation, facial recognition, and handwriting recognition, however, these results are achieved on large corpora of data. There is a need for methods which use smaller data sets and incorporate a priori knowledge for classification and regression tasks.

What is needed are scientific machine learning models with the goal of machine learning models with scientific knowledge of the process being modeled, such as data related to material characterization, that overcome the limitations of the prior art.

SUMMARY OF THE INVENTION

The present disclosure is directed to a scientific machine learning model for processing functional data for machine learning models with scientific knowledge incorporated into the processed data. In particular, the present disclosure includes a system and method for training a classifier for a material characterization.

According to an embodiment of the disclosure, a method for training an artificial neural network is disclosed. The method includes obtaining functional data having phase and amplitude, registering functional data by phase-amplitude separation and statistical analysis on the phase-amplitude separated data with an elastic distance to produce aligned functional data, performing dimensional reduction on the aligned functional data to produce a dimensional representation of the functional space, performing, by a computer system, a training operation to train an artificial neural network based on the dimensional representation of the functional space.

According to an embodiment of the disclosure, a method for material characterization is disclosed. The method includes training a classifier by a method including obtaining functional data having phase and amplitude, registering functional data by phase-amplitude separation and statistical analysis on the phase-amplitude separated data with an elastic distance to produce aligned functional data, performing dimensional reduction on the aligned functional data to produce a dimensional representation of the functional space, performing, by a computer system, a training operation to train an artificial neural network based on the dimensional representation of the functional space. A sample is scanned with an x-ray computed tomography scanner. Functional data is obtained from the computed tomography scanner. The material of the sample is characterized with the artificial neural network with the functional data from the computed tomography scanner.

According to an embodiment of the disclosure, a system for training a classifier for a material characterization is disclosed. The system includes at least one processor and a non-transitory, computer-readable medium having instructions stored thereon that are executable by the at least one processor to cause the system to obtain functional data having phase and amplitude, register functional data by phase-amplitude separation and statistical analysis on the phase-amplitude separated data with an elastic distance to produce aligned functional data, perform dimensional reduction on the aligned functional data to produce a dimensional representation of the functional space, and train a classifier with the dimensional representation of the functional space.

According to an embodiment of the disclosure, a system for material characterization including a computed tomography scanner, and a processor including classifier trained by a system for training a classifier is disclosed. The system for training a classifier includes at least one processor and a non-transitory, computer-readable medium having instructions stored thereon that are executable by the at least one processor to cause the system to obtain functional data having phase and amplitude, register functional data by phase-amplitude separation and statistical analysis on the phase-amplitude separated data with an elastic distance to produce aligned functional data, perform dimensional reduction on the aligned functional data to produce a dimensional representation of the functional space, and train the classifier with the dimensional representation of the functional space. The system further includes a display for displaying the output of the processor to identify materials scanned by the computed tomography scanner.

According to another embodiment of the disclosure, functional data is obtained relating to a hyperspectral computed tomography (H-CT) scan. The H-CT data may, for example, be measured data from an H-CT device or may be simulated data corresponding to H-CT scans. Functional data analysis and topological data analysis of the H-CT data are utilized to construct the input to a classifier for material characterization. Elastic function data analysis (EFDA) is utilized to perform curve registration to generate aligned H-CT voxels. Uniform manifold approximation and projection (UMAP) are applied to the aligned H-CT voxels. By applying UMAP, a dimensionality reduction is generated that is a fuzzy representation of the true data manifold. Finally, a classifier is trained utilizing the dimensionally reduced data from UMAP.

According to another embodiment of the disclosure, the elastic functional data analysis (EFDA) alignment method and the universal manifold approximation projection (UMAP) dimensionality reduction method are used as a pre-processing step for material classification problems. The model according to the present disclosure is trained on a set of simulated hyperspectral computed tomography (H-CT) scans on a small sample of materials, such as sample set of 22 different materials. The method of the present disclosure achieves a greater than 30% improvement in overall classification accuracy when compared to the purely data driven method using the unprocessed H-CT voxels to train a purely data driven method using a 1-D VGG like convolutional neural network (CNN).

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The present disclosure provides a new approach to incorporate scientifically informed constraints within data-driven machine learning models to improve the prediction and scientific inference for sparse data that are too expensive to collect and/or the design space is prohibitively large for the collection of a sufficient training set. The method and system of the present disclosure incorporate domain knowledge in the developed model and will include a priori information, requiring less data to achieve state-of-the-art characterization results. Hybrid models, such as the model utilized in the method and system according to the present disclosure that incorporate both scientific principles and data-driven approaches, i.e., physics informed machine learning (PIML), generalize better than purely data-driven methods and are consistent with the underlying physical phenomena.

In an embodiment, the system and method according to the present disclosure enable material classification using a training set of functional data, such as, but not limited to hyperspectral computed tomography (H-CT) images, where the data size may be smaller than conventional training sets. For example, the smaller training set of data may be measured in gigabytes instead of terabytes or larger. When considering the combinations of potential effect variables obtaining a sufficient number of replicates for a purely data-driven approach is intractable. While the data utilized for the training may be H-CT data, the disclosure is not so limited and may include other applications that encounter sparse data, e.g., material classification for security checkpoints, target identification for remote sensing, surrogate modeling for scientific computing, and climate modeling. The data generating equipment is not limited to H-CT scanners and may include other data generating equipment, such as, but not limited to electro-optical cameras, multispectral imagery, and radar.

Figure 1:
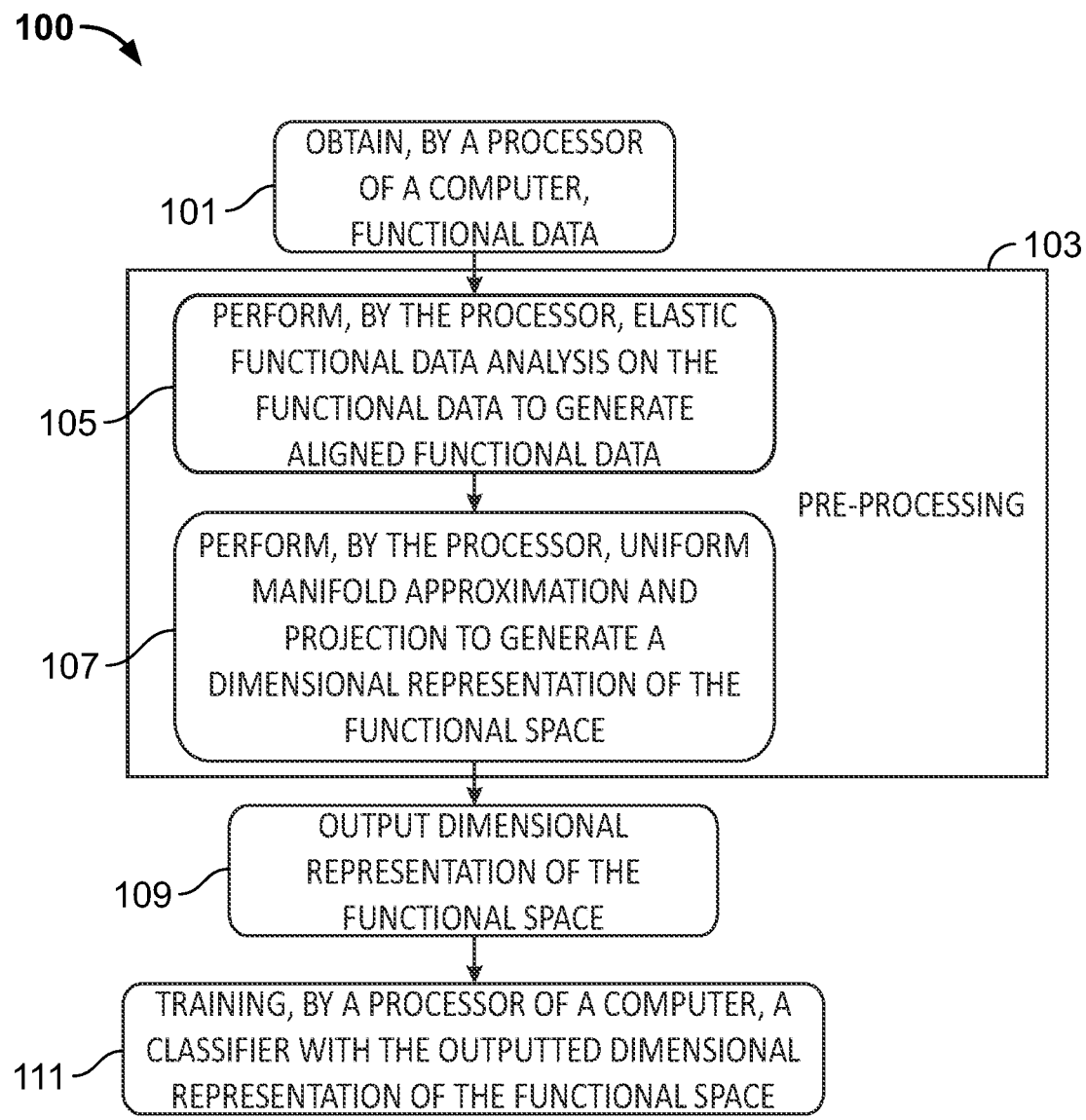
FIG. 1 illustrates a block diagram of a method for training a classifier for a material characterization according to an embodiment of the present disclosure.

FIG. 1 shows a computer-implemented method 100 for training a classifier for a material characterization by analysis of measured data according to the present disclosure. The method 100 may be implemented using a data processing system, such as data processing system 400 of FIG. 4. Method 100 may be accomplished, for example, using the mathematical techniques described below for alignment of functional data and dimensional reduction.

Method 100 according to the present disclosure, as shown in FIG. 1, begins by obtaining, by a processor of a computer, functional data (step 101). For example, step 101 may include obtaining functional data from an H-CT scan or similar device, wherein the data includes phase and amplitude. Once the functional data is obtained, the data is fed to a group of steps that include data pre-processing (step 103), which processes the functional data prior to training a classifier. The pre-processing step 103 includes performing, by the processor of the computer, elastic functional data analysis on the functional data to generate aligned functional data (step 105) and then performing, by the processor, uniform manifold approximation and projection to generate a dimensional representation of the functional space (step 107). The elastic data analysis of step 105 registers the functional data by phase-amplitude separation and statistical analysis on the phase-amplitude separated data to produce aligned functional data. The registration includes determining a distance between functions to align the data into mean functions. This distance is metric, elastic or a proper distance (e.g., symmetric, isometric, follows the triangle inequality). This distance is calculated from the measured functional data, thereby providing a physics informed knowledge of the function. The distance for registration is a calculated value from the measured functional data is not a Euclidean distance, but a functional distance or an elastic distance. Other distances such as the Euclidean, Mahalanobis, and Bregman are not proper in the functional space. Having a proper distance is important in computing statistics (e.g., mean and variance).

The uniform manifold approximation and projection of step 107 performs dimensional reduction on the aligned functional data to produce a dimensional representation of the functional space. The method 100 then outputs the dimensional representation of the functional space 109. The outputted dimensional representation may be stored in a memory storage device and/or transmitted via any suitable data transmission method. The outputted dimensional representation is utilized to train an artificial neural network, such as a classifier 111. The classifier may be any suitable classifier that has the ability to provide classification, such as material characterization from inputted data. For example, suitable classifiers include, but are not limited to machine learning systems, such as a support vector machine (SVM), a random forest (RF) classifier, or convolutional neural network (CNN). The outputted dimensional representation may be utilized for training of the classifier in the same processor as the pre-processing or may be a separate processor, such as a processor utilized in the control and operation of an H-CT scanner.

Figure 2:
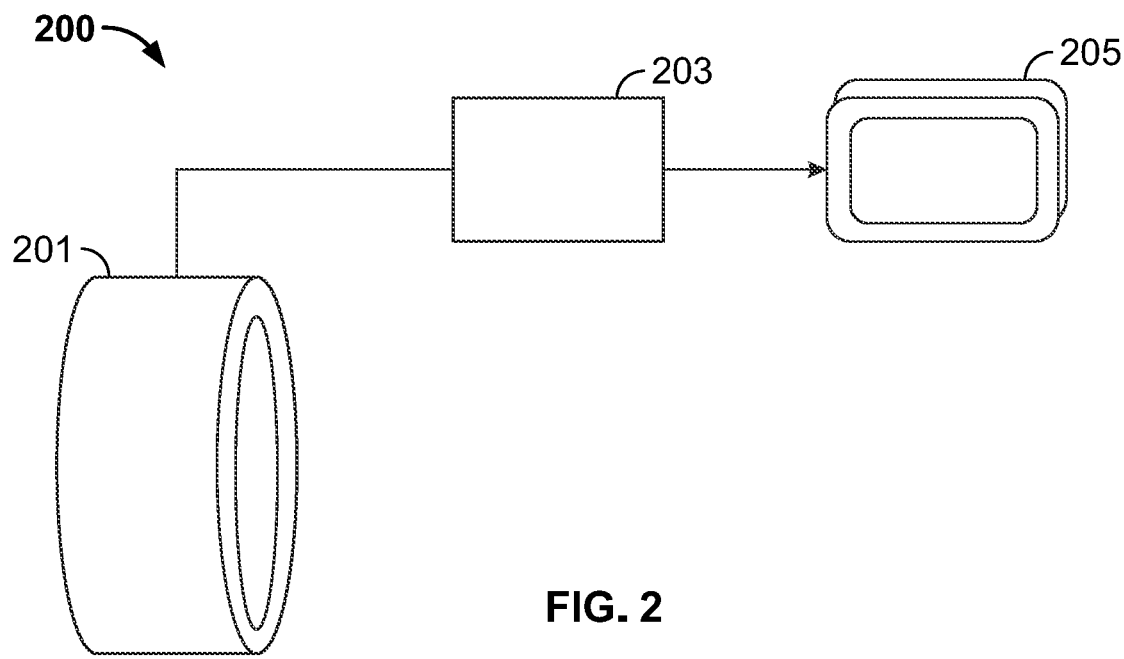
FIG. 2 illustrates a schematic view of a H-CT scanner and data processor system according to the present disclosure.

FIG. 2 shows a material characterization system 200 according to an embodiment of the present disclosure. Material characterization system 200 includes a material scanner 201, such as a computed tomography scanner or hyperspectral computed tomography scanner. Other suitable equipment for use as the material characterization system 200 includes, but is not limited to low frequency sonar or radar. Material characterization system 200 further includes a processor 203 that receives functional data from the material scanner 201, the functional data corresponding to scans performed by the scanner. Processor 203 includes a classifier for identifying materials scanned based upon the functional data received from the material scanner 201. Display 205 includes any suitable output or input/output device that is capable of displaying the output of the processor 203 to identify the material scanned.

Figure 3:
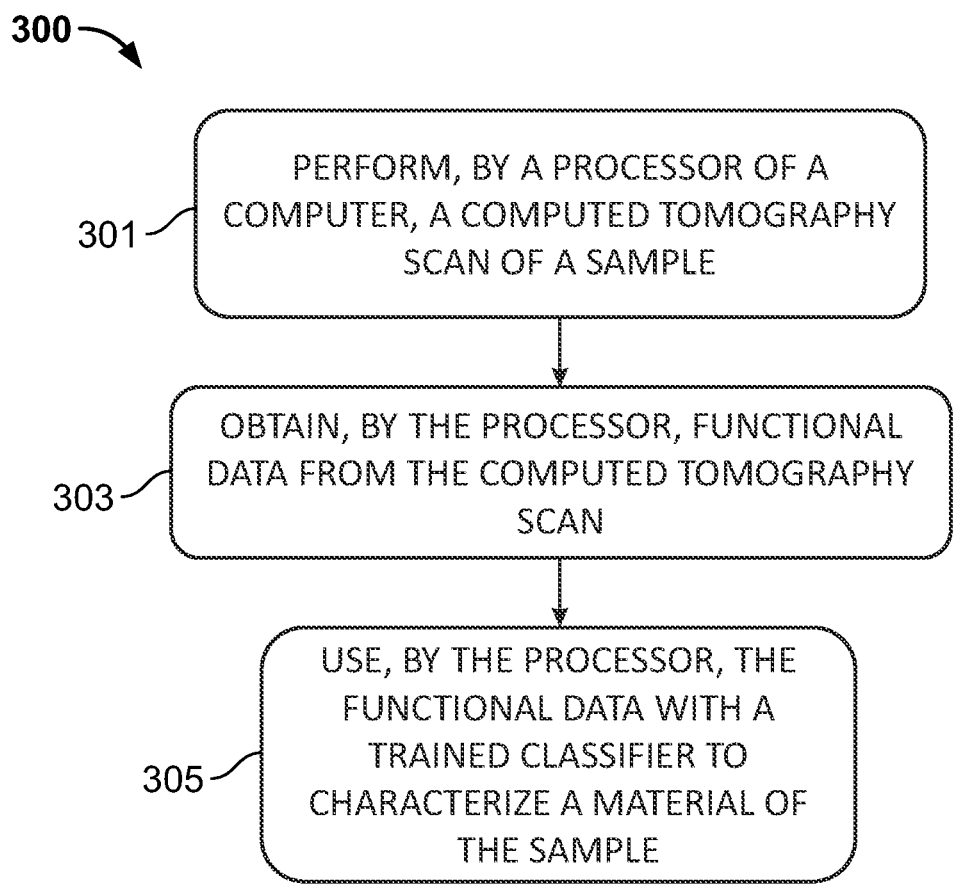
FIG. 3 illustrates a block diagram of a method for material characterization according to an embodiment of the present disclosure.

FIG. 3 shows a computer-implemented method 300 for material characterization by analysis of measured data according to the present disclosure. The computer-implemented method 300 may be implemented using a data processing system, such as data processing system 400 of FIG. 4. Computer-implemented method 300 may be accomplished, for example, using a data processing system 400 including a classifier trained with system 100. Computer-implemented method 300 includes performing, by a processor of a computer, a computed tomography scan of a sample (step 301). In one embodiment, the computer tomography scan is a hyperspectral computed tomography (H-CT) scan. Functional data is obtained, by the processor, from the computed tomography scan (step 303). The functional data is used by a trained classifier to characterize a material of a sample (step 305). The classifier in step 305 has been trained utilizing the method shown and described with respect to FIG. 1.

Figure 4:
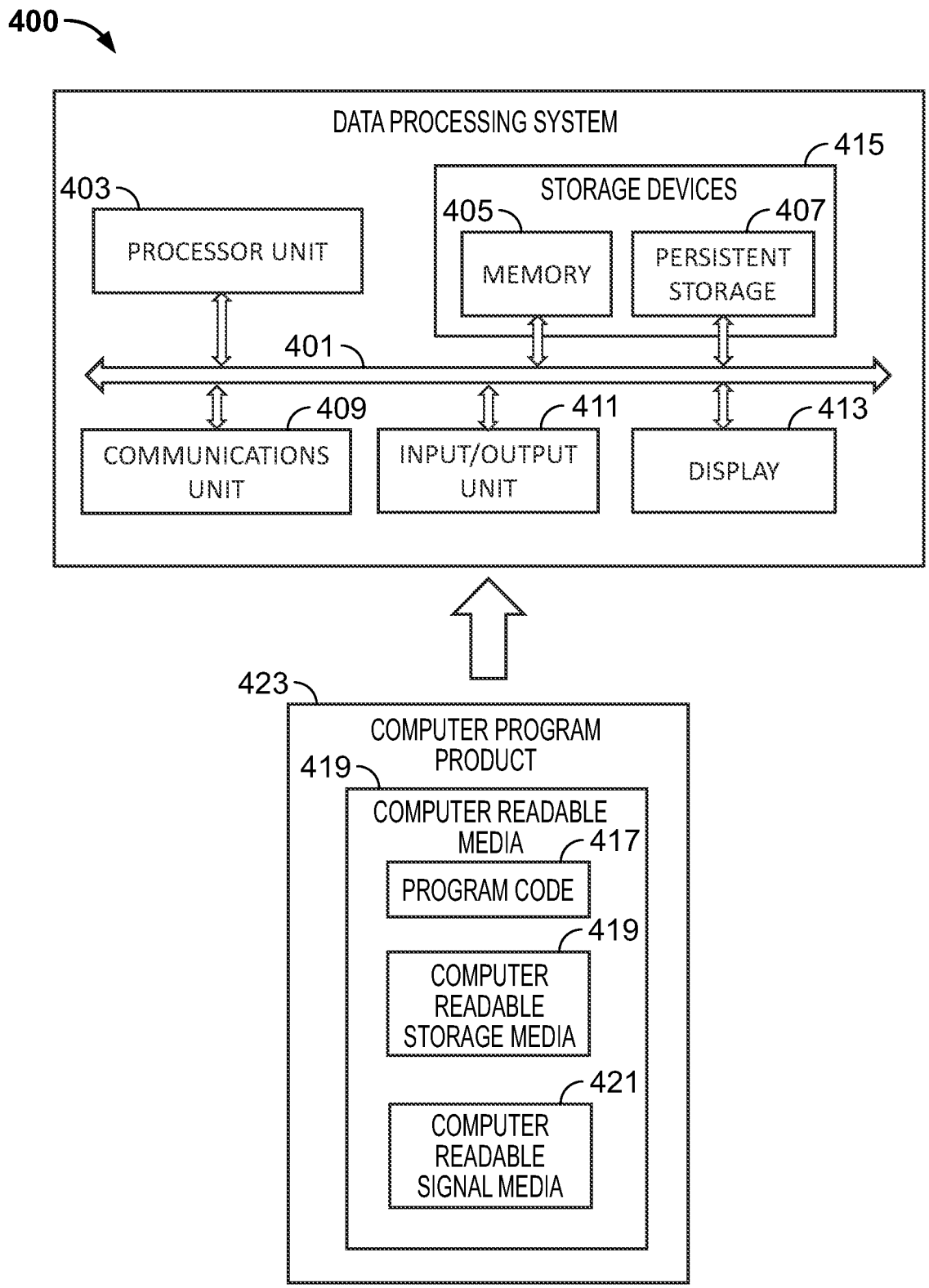
FIG. 4 illustrates a data processing system according to an embodiment of the present disclosure.

FIG. 4 shows an illustration of a data processing system as depicted in accordance with an illustrative embodiment. Data processing system 400 in FIG. 4 is an example of a data processing system that may be used to implement the illustrative embodiments, such as those described with respect to FIG. 1 through FIG. 3. In this illustrative example, data processing system 400 includes communications fabric 401, which provides communications between processor unit 403, memory 405, persistent storage 407, communications unit 409, input/output (I/O) unit 411, and display 413.

Processor unit 403 may be a number of processors, a multi-processor core, or some other type of processor, depending on the particular implementation. A number, as used herein with reference to an item, means one or more items. Further, processor unit 403 may be implemented using a number of heterogeneous processor systems in which a main processor is present with secondary processors on a single chip. As another illustrative example, processor unit 403 may be a symmetric multi-processor system containing multiple processors of the same type.

Memory 405 and persistent storage 407 are examples of storage devices 415. A storage device is any piece of hardware that is capable of storing information, such as, for example, without limitation, data, program code in functional form, and/or other suitable information either on a temporary basis and/or a permanent basis. Storage devices

415 may also be referred to as computer readable storage devices in these examples. Memory 405, in these examples, may be, for example, a random access memory or any other suitable volatile or non-volatile storage device. Persistent storage 407 may take various forms, depending on the particular implementation.

For example, persistent storage 407 may contain one or more components or devices. For example, persistent storage 407 may be a hard drive, a flash memory, a rewritable optical disk, a rewritable magnetic tape, or some combination of the above. The media used by persistent storage 407 also may be removable. For example, a removable hard drive may be used for persistent storage 407.

Communications unit 409, in these examples, provides for communications with other data processing systems or devices. In these examples, communications unit 409 is a network interface card. Communications unit 409 may provide communications through the use of either or both physical and wireless communications links.

Input/output (I/O) unit 411 allows for input and output of data with other devices that may be connected to data processing system 400. For example, input/output (I/O) unit 411 may provide a connection for user input through a keyboard, a mouse, and/or some other suitable input device. Further, input/output (I/O) unit 411 may send output to a printer. Display 413 provides a mechanism to display information to a user.

Instructions for the operating system, applications, and/or programs may be located in storage devices 415, which are in communication with processor unit 403 through communications fabric 401. In these illustrative examples, the instructions are in a functional form on persistent storage 407. These instructions may be loaded into memory 405 for execution by processor unit 403. The processes of the different embodiments may be performed by processor unit 403 using computer implemented instructions, which may be located in a memory, such as memory 405.

These instructions are referred to as program code 417, computer usable program code, or computer readable program code that may be read and executed by a processor in processor unit 403. The program code 417 in the different embodiments may be embodied on different physical or computer readable storage media, such as memory 405 or persistent storage 407.

Program code 417 is located in a functional form on computer readable storage media 419 that is selectively removable and may be loaded onto or transferred to data processing system 400 for execution by processor unit 403. Program code 417 and computer readable storage media 419 form computer program product 423 in these examples. In one example, computer readable storage media 419 may be computer readable storage media 419 or computer readable signal media 421. Computer readable storage media 419 may include, for example, an optical or magnetic disk that is inserted or placed into a drive or other device that is part of persistent storage 407 for transfer onto a storage device, such as a hard drive, that is part of persistent storage 407. Computer readable storage media 419 also may take the form of a persistent storage, such as a hard drive, a thumb drive, or a flash memory, that is connected to data processing system 400. In some instances, computer readable storage media 419 may not be removable from data processing system 400.

Alternatively, program code 417 may be transferred to data processing system 400 using computer readable signal media 421. Computer readable signal media 421 may be, for example, a propagated data signal containing program code 417. For example, computer readable signal media 421 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 417 may be downloaded over a network to persistent storage 407 from another device or data processing system through computer readable signal media 421 for use within data processing system 400. For instance, program code stored in a computer readable storage medium in a server data processing system may be downloaded over a network from the server to data processing system 400. The data processing system providing program code 417 may be a server computer, a client computer, or some other device capable of storing and transmitting program code 417.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 403 may take the form of a hardware unit that has circuits that are manufactured or configured for a particular use. This type of hardware may perform operations without needing program code to be loaded into a memory from a storage device to be configured to perform the operations.

For example, when processor unit 403 takes the form of a hardware unit, processor unit 403 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 417 may be omitted because the processes for the different embodiments are implemented in a hardware unit.

In still another illustrative example, processor unit 403 may be implemented using a combination of processors found in computers and hardware units. Processor unit 403 may have a number of hardware units and a number of processors that are configured to run program code 417. With this depicted example, some of the processes may be implemented in the number of hardware units, while other processes may be implemented in the number of processors.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid-state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

As described above with respect to FIG. 1, the functional data is registered by phase-amplitude separation and statistical analysis. In one embodiment of the present disclosure, this registration is done with Elastic Functional Data Analysis (EFDA).

EFDA includes elastic shape analysis (ESA), which is a collection of techniques for registering functional data, using the process of phase-amplitude separation, and then performing statistical analysis on the separated phase and amplitude components. The method and system according to the present disclosure utilizes ESA to provide the registration of the functional data and the determination of the elastic distance to provide the aligned functional data.

Phase and amplitude represent two orthogonal components of a function's shape, where shape can be generally characterized by those properties of a function that remain unchanged under shape preserving transformations such as rotation, translation, scaling, and phase. The phase component represents the "horizontal" or "timing" variability within trajectories. The amplitude component represents the "vertical" variability independent of phase, translation, and rotation (in $\mathbb{R}^n$, $n \geq 2$). Amplitude is therefore distinct from the usual concept of magnitude by being independent of the observed realization of the trajectory. In other words, magnitude measures the size of the observed realization of a trajectory, and amplitude measures the trajectories shape.

ESA utilizes the Square Root Slope Function (SRSF) for registration. For two real valued functions, the SRSF bijectively maps, up to an additive constant, a real valued function $f$ to its normalized gradient $f'/\sqrt{|f'|}$. Under ESA, two functions are registered by elastically deforming the domain of one function such that the $L^2$ distance between the SRSFs of the two functions is minimized.

The amount of elastic deformation needed to register two functions is measured by the phase distance, while the residual $L^2$ distance between the SRSFs, post registration, defines the amplitude distance between them. Together they are known as the elastic distances. An important aspect of ESA in the system and method according to the present disclosure is that by registering SRSFs, instead of trajectories directly, the phase and amplitude distances are elastic distances (e.g., metrics) and they are invariant to the shape preserving transformations.

To develop technically, let $f$ be a real-valued function with the domain [0,1]; this domain can be easily generalized to any other compact subinterval of $\mathbb{R}$.. For concreteness, only functions that are absolutely continuous on [0,1] will be considered and we let $\mathcal{F}$ denote the set of all such functions. In practice, since the observed data are discrete anyway, this assumption is not a restriction. Also, let $\Gamma$ be the set of orientation-preserving diffeomorphisms of the unit interval $[0,1]$: $\Gamma = \{\gamma : [0,1] \to [0,1] | \gamma(0) = 0, \gamma(1) = 1, \gamma$ is a diffeomorphism$\}$. Elements of $\Gamma$ play the role of warping functions. For any $f \in \mathcal{F}$ and $\gamma \in \Gamma$, the composition $f \circ \gamma$ denotes the time warping of $f$ by $\gamma$. With the composition operation, the set $\Gamma$ is a Lie group with the identity element $\gamma_{id}(t) = t$. The utilization of the group structure of $\Gamma$ allows for the registration and calculation of the elastic distance according to the present system and method and is not generally utilized in other applications relating to functional data analysis.

There are two metrics to measure the amplitude and phase variability of functions. These metrics are elastic distances, one on the quotient space $\mathcal{F}/\Gamma$ (i.e., amplitude) and the other on the group $\Gamma$ (i.e., phase). The amplitude or y-distance for any two functions $f_1, f_2 \in \mathcal{F}$ is defined to be $$d_a(f_1, f_2) = \inf_{\gamma \in \Gamma} \| q_1 - (q_2 \circ \gamma)\sqrt{\dot\gamma} \| \qquad (2.1)$$

where $$q(t) = \text{sign}(\dot f(t))\sqrt{|\dot f(t)|}$$

is known as the square-root slope function (SRSF) ($\dot{f}$ is the time derivative of $f$). The optimization problem in Equation 2.1 is most commonly solved using a Dynamic Programming algorithm. If $f$ is absolutely continuous, then $q \in \mathbb{L}^2([0,1], \mathbb{R})$, henceforth denoted by $\mathbb{L}^2$. For any $\gamma_1, \gamma_2 \in \Gamma$, we have $d_a(f_1 \circ \gamma_1, f_2 \circ \gamma_2) = d_a(f_1, f_2)$, i.e., the amplitude distance is invariant to function warping.

In order to separate phase and amplitude variability in functional data, we need a notion of the mean of functions. First, we compute a mean function and, in the process, warp the given functions to match the mean function. Since we have an elastic distance in $d_a$, we use that to define this mean. For a given collection of functions $f_1, f_2, \ldots, f_n$, let $q_1, q_2, \ldots, q_n$ denote their SRSFs, respectively. Define the Karcher mean of the given function as a local minimum of the following cost functions:

$$\mu_f = \arg\min_{f \in \mathcal{F}} \sum_{i=1}^{n} d_a(f, f_i)^2 \quad (2.2)$$

The solution to this optimization problem can be found by the following procedure:

1. Compute SRSFs $q_1, q_2, \ldots, q_n$ of the given $f_1, f_2, \ldots, f_n$ and select $\mu = q_1$, where $$i = \operatorname{argmin}_{1 \leq i \leq n} \left\| q_i - \frac{1}{n} \sum_{i=1}^{n} q_j \right\|.$$

2. For each $q_i$ find the $\gamma^*_i$ such that $$\gamma^*_i = \operatorname{argmin}_{\gamma \in \Gamma}(\|\mu - (q_i \circ \gamma)\sqrt{\dot{\gamma}}\|)$$

The solution to this optimization comes from the dynamic programming algorithm.

3. Compute the aligned SRSFs using $$\tilde{q}_i \mapsto (q_i \circ \gamma^*_i)\sqrt{\dot{\gamma}^*_i}.$$

4. If the increment $$\left\| \frac{1}{n} \sum_{i=1}^{n} \tilde{q}_i - \mu \right\|$$

is small, then stop. Else, update the mean using $$\mu \mapsto \frac{1}{n} \sum_{i=1}^{n} \tilde{q}_i$$

and return to step 2.

5. The function $\mu$ represents a whole equivalence class of solutions and now we select the preferred element $\mu_q$ of that orbit:
   (a) Compute the mean $\gamma_\mu$ of all $\{\gamma^*_i +\}$ (using the Karcher Mean of Warping Functions). Then compute $$\mu_q = (\mu \circ \gamma_\mu^{-1})\sqrt{\dot{\gamma}_\mu^{-1}}.$$

(b) Update $$\gamma^*_i \mapsto (\gamma^*_i \circ \gamma_\mu^{-1}).$$

Then compute the aligned SRSFs using $$(q_i \circ \gamma^*_i)\sqrt{\dot{\gamma}^*_i}.$$

This procedure results in three items:

1. $\mu_q$, preferred element of the Karcher mean class $\{(\mu_q, \gamma) | \gamma \in \Gamma\}$,
2. $\{\tilde{q}_i\}$, the set of aligned SRSFs, and
3. $\{\gamma^*_i\}$, the set of optimal warping functions.

From the aligned SRSFs, the individual aligned functions are calculated using:

$$\tilde{f}_i(t) = f_i(0) + \int_0^t \tilde{q}_i(s)|\tilde{q}_i(s)| ds.$$

This method provides the ability to directly compare the measurements on the functional level at both levels of variability contained within the data.

As described above with respect to FIG. 1, a reduction of the aligned functional data is performed to produce a dimensional representation of the function space. In one embodiment of the present disclosure this dimensional reduction is provided by Uniform Manifold Approximation and Projection for Dimension Reduction (UMAP).

UMAP approximates a manifold on which the data is assumed to lie and construct a fuzzy simplicial set representation of the approximated manifold. This is performed on the high dimensional data (X) and on a low dimensional representation (Y $\in \mathbb{R}^d$). The representation that optimizes the cross-entropy between the two representations is the one that is chosen.

UMAP is similar to the approach of t-distributed stochastic neighbor embedding (t-SNE), where t-SNE constructs a probability distribution over pairs of high-dimensional objects in such a way that similar objects have a high probability of being picked while dissimilar points have an extremely small probability of being picked. Second, t-SNE defines a similar probability distribution over the points in the low-dimensional map, and it minimizes the Kullback-Leibler divergence between the two distributions.

In UMAP, the high dimensional similarities, $v_{j|i}$, are local fuzzy simplicial set memberships, based on smooth nearest-neighbor (NN) distances $v_{j|i}$ from $x_i \in X$ to one of its k distinct nearest-neighbors $x_i \in X$ $$v_{j|i} = \exp\left[(-d(x_i, x_j) + \rho_i)/\sigma_i\right]$$

where $d(x_i, x_j)$ is the elastic distance on the learned manifold. The parameter $\rho_i$ is the distance to nearest neighbor and $\sigma_i$ is just a normalizing constant. The symmetrization of these similarities, used to produce an undirected graph structure representing the 1-dimensional frame of the fuzzy simplicial set, is carried out by fuzzy set union using the probabilistic t-conorm $$v_{ij} = (v_{j|i} + v_{i|j}) - v_{j|i}v_{i|j}.$$

The graph defined by the v i j is then embedded into a low dimensional space Y, where the dimension is prescribed as a parameter. The low dimensional similarities between the projection $y_i$, and $y_j$, of $x_i$, and $x_j$, into Y via the initial embedding are given by $$w_{ij} = (1 + a\|y_i - y_j\|_2^{2b})^{-1}$$

where a and b are user defined and a gradient descent procedure is used to find them. The defaults for UMAP are a≈1.929 and b≈0.7915.

The UMAP cost function is $$C_{UMAP} = \sum_{i \neq j} v_{ij} \log\left(\frac{v_{ij}}{w_{ij}}\right) + (1 - v_{ij})\log\left(\frac{1 - v_{ij}}{1 - w_{ij}}\right)$$

which penalizes discrepancies in the relative distributions of similarities in X and Y.

By utilizing the elastic metric, which is the proper distance as determined in the registration of the functional data, in the UMAP dimension reduction we can accurately find a lower dimensional representation of the entire functional space, while retaining all physical relationships between the measurements. Thus, keeping the entire physics as part of the measurement of the material and not breaking it down into a physically undefined feature space.

The method and system of the present disclosure achieves a greater than 15%, or greater than 20% or greater than 25% or greater than 30% or greater than 33% improvement in overall classification accuracy when compared to the purely data driven method using the unprocessed H-CT voxels to train a purely data driven method using a 1-D VGG like convolutional neural network (CNN).

Example

In the Inventive Example according to the present method and system and in the comparative Example, simulated hyperspectral CT scans were generated using a Monte Carlo (MC) radiation and electron transport simulation via the Particle Heavy Ion Transport code System (PHITS). The simulation models the H-CT systems are known models where these systems were designed for industrial and security-based applications. Unlike traditional CT, a set of H-CT images are constructed by first capturing the energy deposited by a photon within the detector pixel, then individual images are reconstructed using the energy from each X-ray channel. This reconstruction results in a spectrum of values for each voxel instead of a single integrated value.

Due to the complexity of an H-CT system, tomographic images for each X-ray channel were reconstructed using a MC simulation via PHITS. Each simulated scan is described by user defined geometries, detector size, number of pixels and projections, and the location of the source and position of the object in the field of view. The set of H-CT images are generated by applying a coordinate rotation to the source and detector with respect to the object for each projection. Once the simulation was complete, a post-processing technique was used to generate sinogram data for each energy-channel, this resulted in cross-sectional slices of the internal and external structure of the imaged object.

In total, the data set for the functional data consisted of 394 simulated H-CT scans for the 22 different materials listed in Table 1. The materials in our data set were selected due to their similarity and the difficulty to identify with traditional CT or optical methods. In addition, each material was simulated in different shielding conditions: no shielding (none), 2 mm thick aluminum (Al), or 2 mm polypropylene (PP). Table 1 also details the total number of scans containing that material and the total number voxels in our data set for a given material. All scans with $H_2O_2$ concentrations except 100% $H_2O_2$ are contained in a single image. In addition, two scans contained both $H_2O$ and 100% $H_2O_2$.

Figure 5:
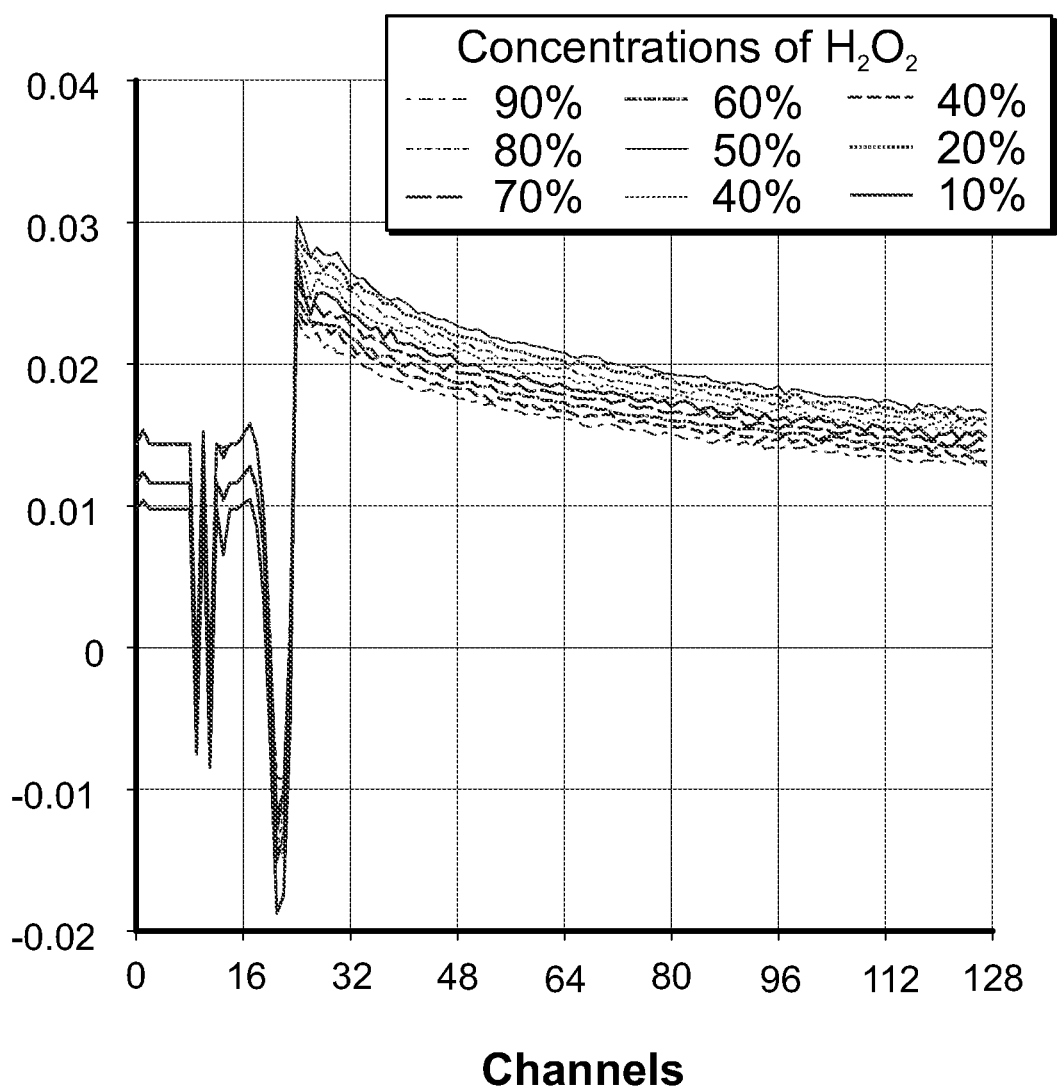
FIG. 5 is a graph showing simulated H-CT scans for 22 different materials listed on Table 1.

Each reconstructed image is a singular slice of the imaged object and consists of 640×640 voxels, where each voxel consists of 128 X-ray channels. FIG. 5 shows the median curves for the varying concentrations of $H_2O_2$.

Figure 6:
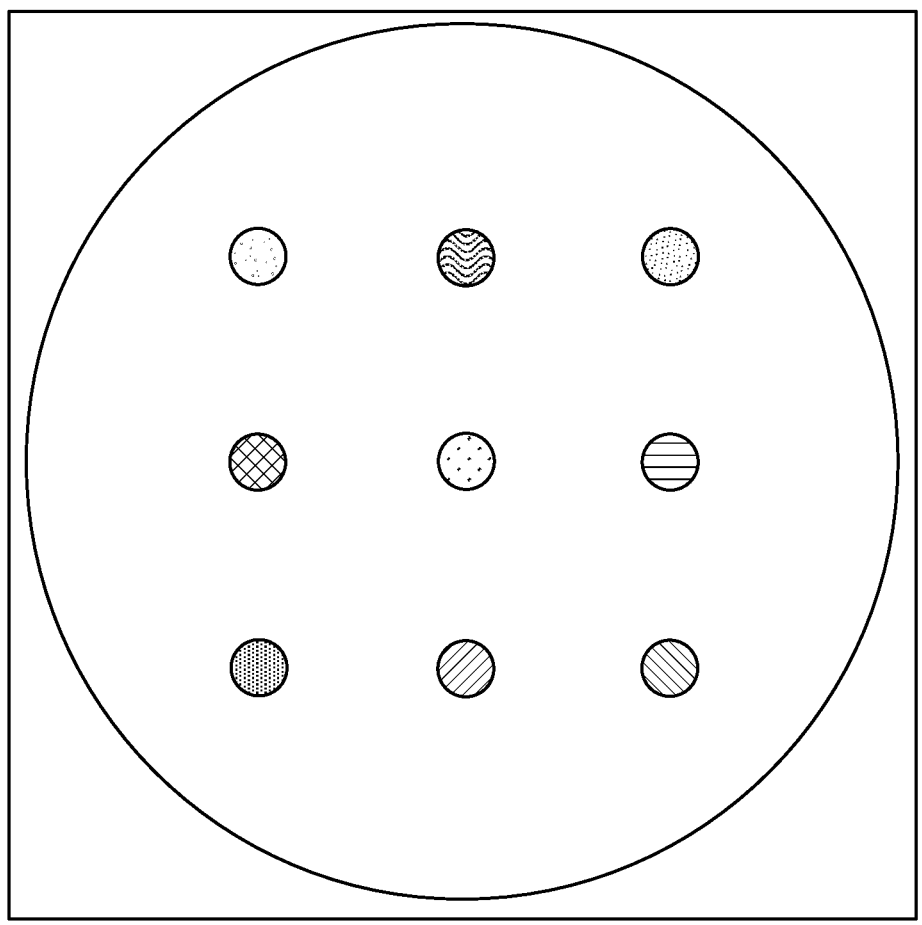
FIG. 6 is a segmentation map for varying concentrations of $H_2O_2$ with a polypropylene shielding.
Figure 6:
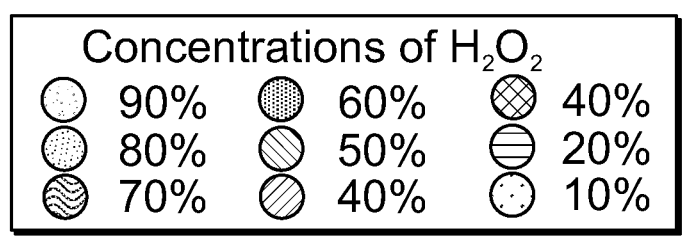

Manual segmentation of each scan was performed using a custom MATLAB® utility. Our segmentation processes was as follows. First, the image was used corresponding to the first X-ray channel to find the boundary of the valid imaging domain since voxels containing materials or shielding are not distinguishable in this channel. Next the X-ray channels (60-70) corresponding to the middle energy levels were used to find voxels containing the material, the shielding if applicable, and empty space. In most scans, there was sufficient energy in these channels to distinguish the different conditions, however, for some materials the X-ray channels in higher bands were needed. For all subsequent processing, we treated each image as a gray scale image. Next, we applied a flood fill on the image to fill any holes and remove artifacts. The flood fill was started in the center of each material. This process aided in improving connectivity between the voxels. A binary mask was then created by performing a morphological closing on the processed image. Finally, the binary mask was first dilated and then eroded using a 3-voxel radius, this guaranteed the corresponding mask did not contain any partially filled voxels. FIG. 6, shows the segmentation map for the varying concentrations of $H_2O_2$ with a polypropylene shielded.

TABLE 1

| Material | Number of Scans | Number of Voxels | Shield Conditions |
| --- | --- | --- | --- |
| $H_2O$ | | 674,073 | none, Al, PP |
| 100% $H_2O_2$ | 10 | 338,533 | none, PP |
| 90% $H_2O_2$ | 79 | 152,590 | none, PP |
| 80% $H_2O_2$ | 79 | 151,637 | none, PP |
| 70% $H_2O_2$ | 79 | 155,276 | none, PP |
| 60% $H_2O_2$ | 79 | 156,398 | none, PP |
| 50% $H_2O_2$ | 79 | 157,539 | none, PP |
| 40% $H_2O_2$ | 79 | 159,610 | none, PP |
| 30% $H_2O_2$ | 79 | 157,443 | none, PP |
| 20% $H_2O_2$ | 79 | 160,974 | none, PP |
| 10% $H_2O_2$ | 79 | 147,851 | none, PP |
| Explosive | 42 | 668,298 | none, Al, PP |
| Acrylic | 20 | 421,160 | none, PP |
| Al | 20 | 421,160 | none, PP |
| Delrin ® | 20 | 421,160 | none, PP |
| Lexan | 19 | 400,102 | none, PP |
| Mg | 20 | 421,160 | none, PP |
| Nylatron ® | 20 | 421,160 | none, PP |

TABLE 1-continued

| Material | Number of Scans | Number of Voxels | Shield Conditions |
|---|---|---|---|
| Nylon | 20 | 421,160 | none, PP |
| Phenolic | 20 | 421,160 | none, PP |
| Salt | 20 | 421,160 | none, PP |
| Teflon ® | 20 | 421,160 | none, PP |

Comparative Example

As a comparative example, a data driven method utilizing a 1-D modification of the VGG convolutional neural network (CNN) was performed on the functional data described above. The VGG network consisted of 5 convolutional blocks (VGGBlock) and two fully connected blocks (FCBlock) followed by a softmax output layer. The first four convolutional blocks consisted of a 1-D convolutional neural network (CNN) layer, a rectified linear unit (ReLU) activation function, a 1-D batch normalization layer followed by an average pooling layer. The last convolutional block adds an additional 1-D CNN layer, ReLU activation function, and 1-D BN layer, before the average pooling layer. Each of the fully connected blocks consists of a fully connected layer, a ReLU activation function, and a dropout layer with a dropout probability of 0.2. Our final architecture is as follows: VGGBlock (64) !VGGBlock(128) ! VGGBlock(256) ! VGGBlock(512) ! VGGBlock(512) ! FCBlock (1024) ! FCBlock(1024) ! softmax(22), where the value in parentheses indicates the number of output dimensions for each block.

The 1-D VGG network is implemented using the PyTorch deep learning framework, where model training and evaluation was performed using two Nvidia GeForcer Titan RTX GPUs. The comparative example model was trained in a fully supervised manner for 500 epochs, where each voxel is classified as one of the 22 different materials for which data was provided. The network parameters were optimized using mini-batch gradient decent to minimize cross-entropy loss, where each mini-batch consisted of 4096 voxels. Mini-batches were constructed using a stratified sampling technique which allowed retention of the same proportion of classes in each batch as in the training set. Optimization was performed using the Adam optimization method using a learning rate of 10-6.

Inventive Example

The physics informed model according to the method and system according to the present disclosure is trained as follows: First, the unprocessed voxels are aligned in phase space using the EFDA method described above. Next, UMAP is applied to the aligned voxels which allows projection of each aligned curve from 128 dimensions to two dimensions. Finally, a classifier is trained on the UMAP projected data points. The voxels were aligned in phase using the fdasrsf python package.

Figure 7:
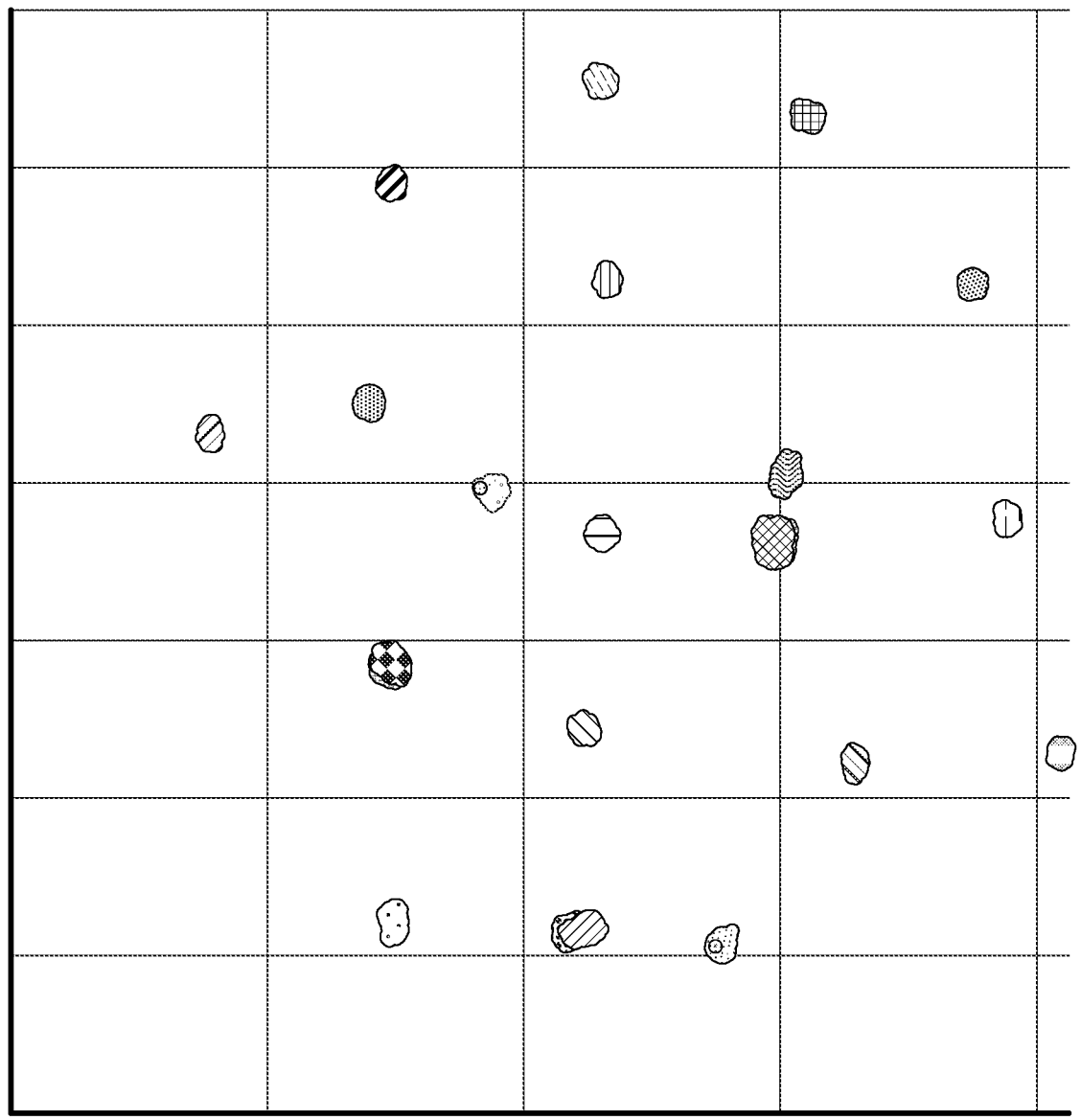
FIG. 7 is a plot of UMAP 2-D projection of the EFDA aligned voxels, according to the present disclosure, processed from the data for H-CT scans, as illustrated in FIG. 5.

Dimensionality reduction was performed using the python implementation of UMAP, where we use a custom distance function as the metric space for our data. The distance function is given as $$D = \left( \int_0^T (q_1 - q_2)^2 dt \right)^{1/2} \quad (4.1)$$

where D is the distance between the square-root slope functions of two different voxels in the training set. Unlike Euclidean distance, the distance function in equation 4.1 is a proper distance metric in the SRSF space. For the other hyperparameters, the default values recommended in the UMAP documentation are utilized. FIG. 7 shows the 2-D UMAP projection of the phase aligned voxels. Because UMAP preserves the topological structure of the data points we can observe distinct clustering between the different classes, where there are a few sets of classes that overlap: 30% $H_2O_2$ and 40% $H_2O_2$, 100% $H_2O_2$ and Delrin, and Nylon and phenolic.

The aligned, registered and dimensionally reduced data from the method and system according to the present disclosure is utilized to train a classifier. Both a support vector machine (SVM) and a random forest (RF) classifier were trained on the UMAP projected data using the scikit-learn machine learning API. For the SVM we used a radial basis function kernel where the kernel coefficient, g=0:5, and the regularization parameter, C=1. The RF classifier is trained using 10 estimators and all other hyperparameters were set to the default values provided in scikit-learn version 0.21. We did not perform any hyperparameter optimization for either the SVM or RF classifier.

Results for the SVM, RF, and CNN classifiers are provided in Table 2 (per class accuracy) and Table 3 (recall, precision, and F1 score). Each classifier achieves an average accuracy of 97.6% (SVM), 98.6% (RF), and 64.7% (CNN). Overall, the SVM and RF achieve similar performance, however, the RF classifier outperforms the SVM on 40% $H_2O_2$, 30% $H_2O_2$, Delrin, and Nylon. The SVM and RF substantially outperform the CNN classifier for all materials, except $H_2O$, Al, and Nylatron which have comparable performance for all three classifiers.

TABLE 2

| Material | SVM | RF | CNN |
|---|---|---|---|
| $H_2O$ | 100.0 | 100.0 | 63.4 |
| 100% $H_2O_2$ | 99.5 | 99.9 | 54.8 |
| 90% $H_2O_2$ | 97.1 | 97.3 | 66.8 |
| 80% $H_2O_2$ | 97.9 | 98.1 | 86.1 |
| 70% $H_2O_2$ | 98.4 | 98.2 | 56.1 |
| 60% $H_2O_2$ | 96.7 | 97.0 | 67.5 |
| 50% $H_2O_2$ | 96.4 | 96.4 | 78.3 |
| 40% $H_2O_2$ | 87.3 | 96.4 | 70.2 |
| 30% $H_2O_2$ | 87.0 | 96.4 | 69.3 |
| 20% $H_2O_2$ | 96.9 | 97.4 | 74.6 |
| 10% $H_2O_2$ | 97.4 | 97.9 | 96.0 |
| Explosive | 100.0 | 100.0 | 87.9 |
| Acrylic | 99.6 | 99.5 | 6.8 |
| Al | 99.9 | 100.0 | 98.8 |
| Delrin | 93.4 | 97.2 | 17.9 |
| Lexan | 99.9 | 100.0 | 30.8 |
| Mg | 99.9 | 99.9 | 91.4 |
| Nylatron | 100.0 | 100.0 | 100.0 |
| Nylon | 84.4 | 89.8 | 20.9 |
| Phenolic | 97.9 | 98.8 | 38.6 |
| Salt | 99.9 | 99.9 | 92.0 |
| Teflon | 100.0 | 99.9 | 91.3 |

TABLE 3

| Material | Precision [%] | | | Recall [%] | | | F1 [%] | | |
|---|---|---|---|---|---|---|---|---|---|
| | SVM | RF | CNN | SVM | RF | CNN | SVM | RF | CNN |
| $H_2O$ | 95.6 | 98.9 | 70.8 | 100.0 | 100.0 | 63.4 | 97.6 | 99.4 | 66.9 |
| 100% $H_2O_2$ | 98.4 | 96.7 | 75.6 | 99.5 | 99.9 | 54.8 | 99.0 | 98.3 | 63.5 |
| 90% $H_2O_2$ | 96.3 | 96.9 | 44.0 | 97.1 | 97.3 | 66.8 | 96.6 | 97.1 | 53.1 |
| 80% $H_2O_2$ | 99.1 | 97.6 | 64.7 | 97.9 | 98.1 | 86.1 | 98.4 | 97.8 | 73.9 |
| 70% $H_2O_2$ | 94.0 | 98.1 | 23.6 | 98.4 | 98.2 | 56.1 | 96.0 | 98.1 | 33.2 |
| 60% $H_2O_2$ | 87.5 | 96.6 | 33.6 | 96.7 | 97.0 | 67.5 | 90.9 | 96.8 | 44.9 |
| 50% $H_2O_2$ | 97.2 | 97.7 | 39.1 | 96.4 | 96.4 | 78.3 | 96.8 | 97.0 | 52.1 |
| 40% $H_2O_2$ | 99.3 | 96.3 | 51.4 | 87.3 | 96.4 | 70.2 | 92.8 | 96.4 | 59.3 |
| 30% $H_2O_2$ | 91.0 | 96.3 | 38.1 | 87.0 | 96.4 | 69.3 | 88.5 | 96.3 | 49.2 |
| 20% $H_2O_2$ | 99.6 | 98.4 | 40.2 | 96.9 | 97.4 | 74.6 | 98.2 | 97.9 | 52.2 |
| 10% $H_2O_2$ | 85.0 | 98.4 | 52.2 | 97.4 | 97.9 | 96.0 | 90.1 | 98.2 | 67.6 |
| Explosive | 99.7 | 100.0 | 92.5 | 100.0 | 100.0 | 87.9 | 99.8 | 100.0 | 90.1 |
| Acrylic | 99.3 | 99.2 | 33.3 | 99.6 | 99.5 | 6.8 | 99.4 | 99.3 | 11.2 |
| Al | 100.0 | 100.0 | 99.8 | 99.9 | 100.0 | 98.8 | 100.0 | 100.0 | 99.3 |
| Delrin | 99.0 | 99.9 | 53.5 | 93.4 | 97.2 | 17.0 | 96.1 | 98.5 | 26.8 |
| Lexan | 99.9 | 100.0 | 44.7 | 99.9 | 100.0 | 30.8 | 99.9 | 100.0 | 36.5 |
| Mg | 99.8 | 100.0 | 83.8 | 99.9 | 99.9 | 91.4 | 99.9 | 99.9 | 87.4 |
| Nylatron | 100.0 | 100.0 | 100.0 | 100.0 | 100.0 | 100.0 | 100.0 | 100.0 | 100.0 |
| Nylon | 99.3 | 98.8 | 35.0 | 84.4 | 89.8 | 20.9 | 91.2 | 94.0 | 26.2 |
| Phenolic | 94.2 | 91.7 | 42.0 | 97.9 | 98.8 | 38.6 | 96.0 | 95.1 | 40.2 |
| Salt | 100.0 | 99.9 | 93.1 | 99.9 | 99.9 | 92.0 | 99.9 | 99.9 | 92.6 |
| Teflon | 100.0 | 99.9 | 90.2 | 100.0 | 99.9 | 91.3 | 100.0 | 99.9 | 90.7 |

Figure 8:
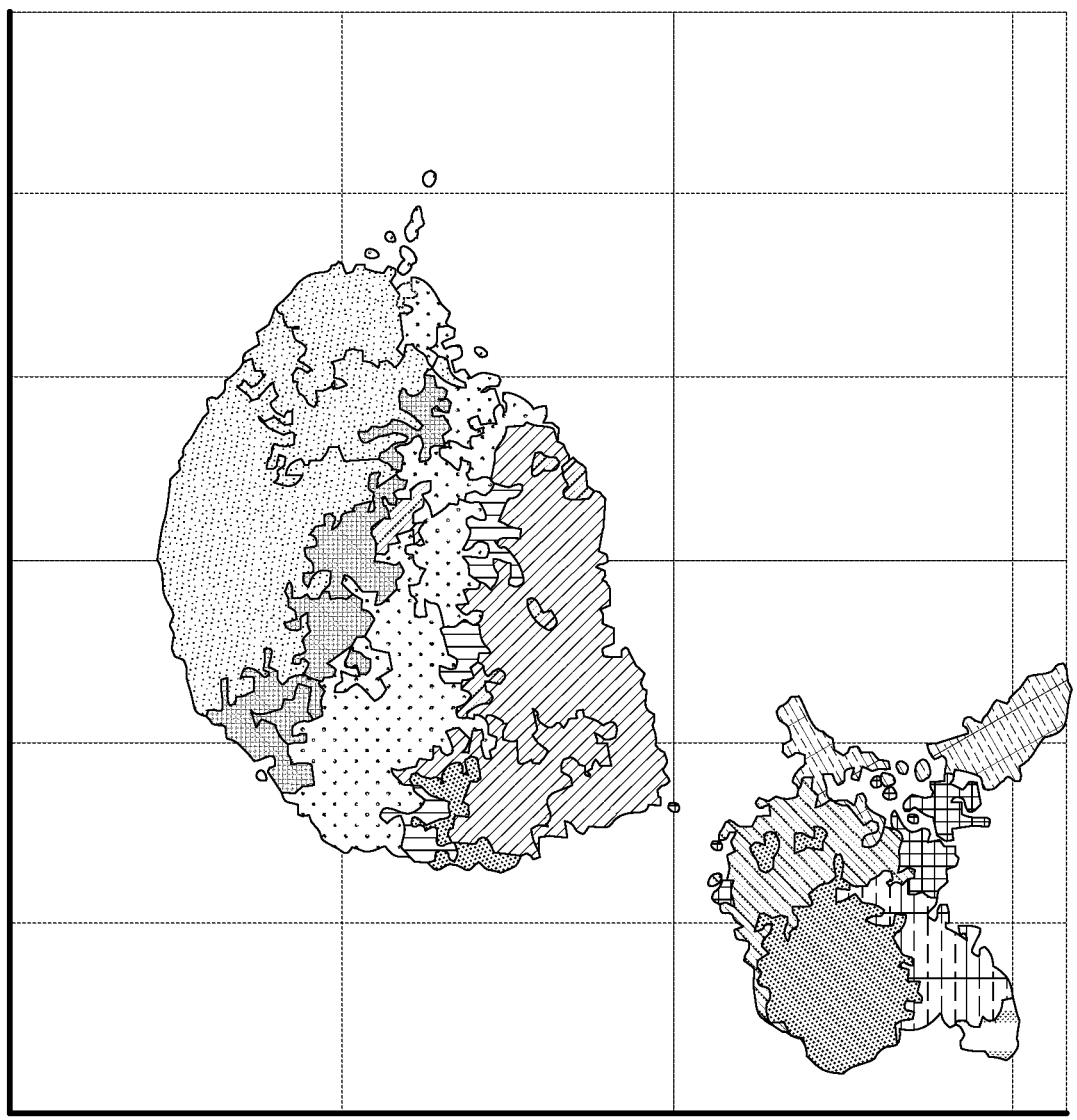
FIG. 8 is a plot of UMAP 2-D projection of unprocessed voxels processed from the data for H-CT scans, as illustrated in FIG. 5, according to a known data processing process.

While not wishing to be bound by theory, it is believed the Inventive Example outperforms the CNN Comparative Example because it is able to learn the topology of the data manifold (see FIG. 7) once our data is aligned in phase. When applying UMAP to the unprocessed voxels, the topology of the manifold is unstructured as observed in FIG. 8 which shows a scatter plot of the UMAP 2-D projection. For FIG. 8, the Euclidean distance were used as the metric space. From FIG. 8, it can be observed that there are no distinct groupings of the voxels by material type. This is a result of noise along the phase component of each voxel. The method and system according to the present invention in the Inventive Example achieves an overall accuracy of 97.6% (SVM)/98.6% (RF), which is a 32.9%/33.9% improvement when compared to the data driven approach.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The following References are incorporated herein in their entireties.

[1] R. B. Girshick, "Fast R-CNN," arXiv preprint arXiv: 1504.08083, 2015.

[2] J. Long, E. Shelhamer, and T. Darrell, "Fully convolutional networks for semantic segmentation," in Proc. IEEE Comput. Soc. Conf. Comput. Vis. Pattern Recognit., 2015, pp. 3431-3440.

[3] W. Chen, X. Chen, J. Zhang, and K. Huang, "Beyond triplet loss: a deep quadruplet network for person re-identification," arXiv preprint arXiv: 1704.01719, 2017.

[4] V. Carbune, P. Gonnet, T. Deselaers, H. A. Rowley, A. N. Daryin, M. Calvo, L. Wang, D. Keysers, S. Feuz, and P. Gervais, "Fast multi-language lstm-based online handwriting recognition," arXiv preprint arXiv: 1902.10525, 2019.

[5] I. Goodfellow, Y. Bengio, and A. Courville, Deep learning. MIT press, 2016.

[6] S. M. Stigler, "Do robust estimators work with real data?" The Annals of Statistics, pp. 1055-1098, 1977.

[7] A. Karpatne, G. Atluri, J. H. Faghmous, M. Steinbach, A. Banerjee, A. Ganguly, S. Shekhar, N. Samatova, and V. Kumar, "Theory-guided data science: A new paradigm for scientific discovery from data," IEEE Transactions on Knowledge and Data Engineering, vol. 29, no. 10, pp. 2318-2331, 2017.

[8] S. Lee and N. Baker, "Basic research needs for scientific machine learning: Core technologies for artificial intelligence," USDOE Office of Science (SC) (United States), Tech. Rep., 2018.

[9] C. Rudin, "Please stop explaining black box models for high stakes decisions," arXiv preprint arXiv: 1811.10154, 2018.

[10] S. Koundinyan, E. S. J. Jimenez, K. R. Thompson, and A. N. Suknot, "Machine learning for industrial material classification applications with color ct datasets," Sandia National Laboratories, Tech. Rep., 2018.

[11] I. O. Gallegos, S. Koundinyan, A. N. Suknot, E. S. Jimenez, K. R. Thompson, and R. N. Goodner, "Unsupervised learning methods to perform material identification tasks on spectral computed tomography data," in Proceedings Volume 10763, Radiation Detectors in Medicine, Industry, and National Security XIX, vol. 10763, 2018.

[12] E. S. Jimenez, K. R. Thompson, A. Stohn, and R. N. Goodner, "Leveraging multi-channel x-ray detector technology to improve quality metrics for industrial and security applications," in Proceedings Volume 10393, Radiation Detectors in Medicine, Industry, and National Security XVIII, vol. 10393, 2017.

[13] A. Srivastava, E. Klassen, S. H. Joshi, and I. H. Jermyn, "Shape analysis of elastic curves in euclidean spaces," IEEE Transactions on Pattern Analysis and Machine Intelligence, vol. 33, no. 7, pp. 1415-1428, 2011.

[14] S. Kurtek, A. Srivastava, and W. Wu, "Signal estimation under random time-warpings and nonlinear signal alignment," in Proceedings of Neural Information Processing Systems (NIPS), 2011.

[15] J. D. Tucker, W. Wu, and A. Srivastava, "Generative models for functional data using phase and amplitude separation," Computational Statistics and Data Analysis, vol. 61, pp. 50-66, 2013.

[16] A. Srivastava and E. P. Klassen, Functional and shape data analysis. Springer, 2016.

[17] D. Robinson, "Functional analysis and partial matching in the square root velocity framework," Ph. D. dissertation, Florida State University, 2012.

[18] A. Srivastava, E. Klassen, S. Joshi, and I. Jermyn, "Shape analysis of elastic curves in Euclidean spaces," IEEE Trans. Pattern Analysis and Machine Intelligence, vol. 33, no. 7, pp. 1415-1428, 2011.

[19] J. Marron, J. Ramsay, L. Sangalli, and A. Srivastava, "Functional data analysis of amplitude and phase variation," Statistical Science, vol. 30, no. 4, pp. 468-484, 2015.

[20] S. Lahiri, D. Robinson, and E. Klassen, "Precise matching of PL curves in Rn in the Square Root Velocity framework," Geometry, Imaging and Computing, vol. 2, pp. 133-186, 2015.

[21] L. J. P. van der Maaten and G. E. Hinton, "Visualizing High-Dimensional Data Using t-SNE," Journal of Machine Learning Research, no. 9, pp. 2579-2605, 2008.

[22] L. McInnes, J. Healy, and J. Melville, "UMAP: Uniform Manifold Approximation and Projection for Dimension Reduction," arXiv: 1802.03426v2 [stat. ML], 2018.

[23] K. Niita, T. Sato, H. Iwase, H. Nose, H. Nakashima, and L. Sihver, "Phits—a particle and heavy ion transport code system," Radiation Measurements, vol. 41, no. 9, pp. 1080-1090, 2006.

[24] E. S. Jimenez, N. M. Collins, E. A. Holswade, M. L. Devonshire, and K. R. Thompson, "Comparing imaging capabilities of multi-channel detectors to traditional x-ray detection technology for industrial and security applications," in SPIE Optical Engineering+ Applications. International Society for Optics and Photonics, 2016.

[25] E. S. Jimenez, K. R. Thompson, A. Stohn, and R. N. Goodner, "Leveraging multi-channel x-ray detector technology to improve quality metrics for industrial and security applications," in SPIE Optical Engineering+ Applications. International Society for Optics and Photonics, 2017.

[26] I. O. Gallegos, G. M. Dalton, A. M. Stohn, S. P. Koundinyan, K. R. Thompson, and E. S. Jimenez, "High-fidelity calibration and characterization of a spectral computed tomography system," in SPIE Optical Engineering+ Applications. International Society for Optics and Photonics, 2019.

[27] K. Simonyan and A. Zisserman, "Very deep convolutional networks for large-scale image recognition," 2015, arXiv: 1409.1556.

[28] V. Nair and G. E. Hinton, "Rectified linear units improve restricted boltzmann machines," in Proc. 27th Int. Conf. on Int. Conf. Mach. Learning, June 2010, pp. 807-814.

[29] S. Ioffe and C. Szegedy, "Batch normalization: Accelerating deep network training by reducing internal covariate shift," 2015, arXiv: 1502.03167.

[30] A. Paszke, S. Gross, S. Chintala, G. Chanan, E. Yang, Z. DeVito, Z. Lin, A. Desmaison, L. Antiga, and A. Lerer, "Automatic differentiation in pytorch," in 31st Conf. Neural Inform. Process. Syst., December 2017.

[31] D. P. Kingma and J. Ba, "Adam: A method for stochastic optimization," 2014, arXiv: 1412.6980.

[32] C. M. Bishop, Pattern Recognition and Machine Learning (Information Science and Statistics). Secaucus, NJ, USA: Springer-Verlag New York, Inc., 2006.

[33] M. Kuhn and K. Johnson, Applied Predictive Modeling. New York, Heidelberg, Dordrecht, London: Springer, 2013.

[34] F. Pedregosa, G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot, and E. Duchesnay, "Scikit-learn: Machine learning in Python," Journal of Machine Learning Research, vol. 12, pp. 2825-2830, 2011.

What is claimed is:

1. A method for training an artificial neural network comprising:

obtaining functional data having phase and amplitude;

registering the functional data by phase-amplitude separation of the functional data to produce separated phase and amplitude components with an elastic distance and performing statistical analysis on the separated phase and amplitude components to produce aligned functional data;

performing dimensional reduction on the aligned functional data to produce a dimensional representation of a functional space of the aligned functional data; and performing, by a computer system, a training operation to train an artificial neural network based on the dimensional representation of the functional space.

2. The method of claim 1, wherein the registering functional data includes elastic function data alignment.

3. The method of claim 2, wherein the elastic function data alignment includes applying a square root slope function.

4. The method of claim 1, wherein the elastic distance is a mean function utilized to warp functions of the phase and amplitude of the functional data.

5. The method of claim 4, wherein the elastic distance is defined as the following equation:

$$d_a(f_1, f_2) = \inf_{\gamma \in \Gamma} \|q_1 - (q_2 \circ \gamma)\sqrt{\dot{\gamma}}\|$$

where $d_a$ is the elastic distance, $f_1$, $f_2$ are any two functions of the functional data, group $\Gamma$ is a set of orientation-preserving diffeomorphism representing the phase of the functional data, $q_1$ and $q_2$ are the square root slope function of the functional data, $\gamma$ is the amount of time-warping of $f_1$ and $f_2$.

6. The method of claim 1, wherein dimensional reduction on the aligned functional data is performed with uniform manifold approximation and projection.

7. The method of claim 1, wherein the artificial neural network is a classifier for material characterization.

8. The method of claim 7, wherein the classifier is a support vector machine (SVM), a random forest (RF) classifier or convolutional neural network (CNN).

9. A method for material characterization comprising:
    training a classifier according to the method of claim 1;
    scanning a sample with an x-ray computed tomography scanner;
    obtaining functional data from the computed tomography scanner;
    characterizing the material of the sample with the functional data from the computed tomography scanner; and
    displaying the characterization result on a display.

10. A system for training a classifier for a material characterization comprising:
    at least one processor; a non-transitory, computer-readable medium having instructions stored thereon that are executable by the at least one processor to cause the system to:
    obtain the functional data having phase and amplitude;
    register functional data by phase-amplitude separation of the functional data to produce separated phase and amplitude components with an elastic distance and perform statistical analysis on the separated phase and amplitude components to produce aligned functional data;
    perform dimensional reduction on the aligned functional data to produce a dimensional representation of a functional space of the aligned functional data; and
    train a classifier with the dimensional representation of the functional space.

11. The system of claim 10, wherein the functional data is voxel data from an x-ray computed tomography scan.

12. The system of claim 10, wherein the registering functional data includes elastic function data alignment.

13. The system of claim 10, wherein the elastic distance is the mean function utilized to warp functions of the phase and amplitude.

14. The system of claim 13, wherein the elastic distance is defined as the following equation:

$$d_a(f_1, f_2) = \inf_{\gamma \in \Gamma} \|q_1 - (q_2 \circ \gamma)\sqrt{\dot{\gamma}}\|$$

where $d_a$ is the elastic distance, $f_1$, $f_2$ are any two functions of the functional data, group $\Gamma$ is a set of orientation-preserving diffeomorphism representing the phase of the functional data, $q_1$ and $q_2$ are the square root slope function of the functional data, $\gamma$ is the amount of time-warping of $f_1$ and $f_2$.

15. The system of claim 10, wherein dimensional reduction on the aligned functional data is performed with uniform manifold approximation and projection.

16. The system of claim 10, wherein the classifier is one of a support vector machine (SVM), a random forest (RF) classifier or convolutional neural network (CNN).

17. The system of claim 10, wherein the dimensional representation of the functional space is a fuzzy representation of the data manifold.

18. A system for material characterization comprising:
    a computed tomography scanner;
    a processor including classifier trained by the system of claim 10; and
    a display for displaying the output of the processor to identify materials scanned by the computed tomography scanner.

19. The system of claim 18, wherein the computed tomography scanner is a hyperspectral computed tomography scanner.

20. The system of claim 18, wherein the system identifies materials with an accuracy greater than 30% more accurate than a process having a classifier trained utilizing functional data that is not registered and aligned with the elastic distance.

* * * * *